US012728847B2

(12) United States Patent
Liu et al.

(10) Patent No.: US 12,728,847 B2
(45) Date of Patent: Sep. 8, 2026

(54) CRASH RISK PRECISION METHOD AND SYSTEM OF EMERGENCY RESCUE AUTONOMOUS VEHICLE BASED ON HM-TRW AND HAGENN STRUCTURE SEARCH

(71) Applicant: Jiangsu University, Zhenjiang (CN)

(72) Inventors: Qingchao Liu, Zhenjiang (CN); Ruohan Yu, Zhenjiang (CN); Yingfeng Cai, Zhenjiang (CN); Hai Wang, Zhenjiang (CN); Long Chen, Zhenjiang (CN)

(73) Assignee: Jiangsu University, Zhenjiang (CN)

( * ) Notice: Subject to any disclaimer, the term of this patent is extended or adjusted under 35 U.S.C. 154(b) by 0 days.

(21) Appl. No.: 19/117,784

(22) PCT Filed: Sep. 19, 2024

(86) PCT No.: PCT/CN2024/119646
§ 371 (c)(1),
(2) Date: Apr. 2, 2025

(87) PCT Pub. No.: WO2025/189722
PCT Pub. Date: Sep. 18, 2025

(65) Prior Publication Data

US 2026/0008457 A1 Jan. 8, 2026

(30) Foreign Application Priority Data

Mar. 13, 2024 (CN) ......................... 202410283548.5

(51) Int. Cl.
*B60W 30/095* (2012.01)
*B60W 50/00* (2006.01)
(Continued)

(52) U.S. Cl.
CPC .... *B60W 30/0956* (2013.01); *B60W 50/0097* (2013.01); *B60W 50/14* (2013.01);
(Continued)

(58) Field of Classification Search
CPC ......... B60W 30/0956; B60W 50/0097; B60W 50/14; B60W 60/0015; B60W 60/0025;
(Continued)

(56) References Cited

U.S. PATENT DOCUMENTS

2023/0230484 A1* 7/2023 Al Faruque ............ G06V 20/56

FOREIGN PATENT DOCUMENTS

CN 109660967 A 4/2019
CN 111104969 A 5/2020
(Continued)

OTHER PUBLICATIONS

Ji et al., "Higher-order memory guided temporal random walk for dynamic heterogeneous network embedding", vol. 143, 2023, 109766, https://doi.org/10.1016/j.patcog.2023.109766 (Year: 2023).*
(Continued)

*Primary Examiner* — Erin M Piateski
*Assistant Examiner* — Hajar Hassaniardekani
(74) *Attorney, Agent, or Firm* — Cooper Legal Group, LLC

(57) ABSTRACT

The present disclosure discloses an emergency rescue autonomous driving vehicle collision risk prediction method and a system based on HM-TRW and HAGENN structure search, abstracts the relationship between the emergency rescue vehicle and the surrounding moving objects into a dynamic heterogeneous diagram, captures the importance and dynamic of each surrounding moving object and various interactive relations by using HM-TRW, and merges with the original characteristics of each surrounding moving object. Then input HAGENN to predict the collision risk,
(Continued)

and apply the dynamic heterogeneous graph embedding method to the hierarchical attention neural network to further learn the heterogeneous characteristics and dynamic changes of the surrounding moving objects. When calculating the attention force of different levels, the positioning space is used to determine the application position of attention, the parameterized space is used to search the attention function, and multi-stage differential search is introduced to accelerate the above search process. The present disclosure can more comprehensively and accurately predict the collision risk in the operation process of the emergency rescue autonomous driving vehicle.

8 Claims, 10 Drawing Sheets

(51) Int. Cl.

| | |
|---|---|
| ***B60W 50/14*** | (2020.01) |
| ***B60W 60/00*** | (2020.01) |
| ***G06N 3/02*** | (2006.01) |

(52) U.S. Cl.
CPC .... *B60W 60/0015* (2020.02); *B60W 60/0025* (2020.02); *G06N 3/02* (2013.01); *B60W 2050/146* (2013.01); *B60W 2554/40* (2020.02)

(58) Field of Classification Search
CPC ........ B60W 2050/146; B60W 2554/40; G06N 3/02
See application file for complete search history.

(56) References Cited

FOREIGN PATENT DOCUMENTS

| | | | |
|---|---|---|---|
| CN | 113762473 | A | 12/2021 |
| CN | 116215569 | A | 6/2023 |
| CN | 116853272 | A | 10/2023 |
| CN | 117290997 | A | 12/2023 |
| CN | 118013856 | A | 5/2024 |
| KR | 20230083438 | A | 6/2023 |

OTHER PUBLICATIONS

International Search Report cited in PCT/CN2024/119646, mailed Dec. 28, 2024, 4 pages.

Ji, et al., “Higher-order memory guided temporal random walk for dynamic heterogeneous network embedding”, Jun. 10, 2023, 1873-5142.

English Translation of Written Opinion cited in PCT/CN2024/119646, mailed Dec. 28, 2024, 9 pages.

Jing Jing et al., “A Road Network-level Traffic Accident Risk Prediction Method, Journal of Beijing University of Posts and Telecommunications”, vol. 45, No. 2, Mar. 9, 2022 (Mar. 9, 2022), pp. 72-77, with English abstract.

* cited by examiner

CRASH RISK PREDICTION METHOD AND SYSTEM OF EMERGENCY RESCUE AUTONOMOUS VEHICLE BASED ON HM-TRW AND HAGENN STRUCTURE SEARCH

TECHNICAL FIELD

The present disclosure belongs to an automatic driving collision risk prediction technology. In particular, the present disclosure relates to a collision risk prediction method and system for emergency rescue automatic driving vehicles based on higher-order memory guided temporal random walk (HM-TRW) and hierarchical attention graph embedding neural network (HAGENN) structure search.

BACKGROUND

When the emergency rescue autonomous driving vehicle is in emergency, it needs to arrive at the target place timely and safely in order to complete the rescue task efficiently. On the way to the target site, there may be a variety of uncontrollable factors and possible accidents, thus delaying the rescue mission. Therefore, emergency rescue autonomous driving vehicles must have the ability to make reasonable decisions according to the actual situation. In the process of decision-making, the prediction of collision risk is one of the indispensable links. Collision risk prediction firstly uses vehicle sensors and communication technology to collect data of surrounding moving objects and predict their future trajectories. By using the data of surrounding moving objects and self-vehicle (emergency rescue autonomous driving vehicle), the collision risk of autonomous driving vehicle can be predicted, which provides a basis for vehicle trajectory planning and action decision. Finally, the chassis drives the vehicle safely and efficiently according to the output decision-making action parameters.

In the existing technology, most of the methods to predict the collision risk of emergency rescue autonomous driving vehicles are machine learning and deep learning. However, the existing models are difficult to capture complex heterogeneous characteristics and dynamic relationships in the real vehicle environment, which limits the prediction accuracy. In addition, some deep learning models have low computational efficiency when dealing with large-scale real-time data, which is not conducive to real-time prediction.

SUMMARY

In view of the deficiency in the prior art, the invention provides an emergency rescue autonomous driving vehicle collision risk prediction method and system based on HM-TRW and HAGENN structure search.

The invention realizes the above technical purpose through the following technical means.

A collision risk prediction method of emergency rescue autonomous driving vehicle based on HM-TRW and HAGENN structure search:

Data set construction: in the real car experiment, the self-vehicle data and the surrounding moving object data are collected by the data acquisition equipment, and the data are preprocessed and stored in the database.

Collision risk prediction model construction: the dynamic heterogeneous graph is constructed by using the collected self-vehicle data and the surrounding moving object data, and the heterogeneous characteristics and dynamic changing rules of the dynamic heterogeneous graph are learned by the high-order memory guided time random walk algorithm. The node representation of the surrounding moving objects is then fed to the hierarchical injection intention embedded neural network for collision risk pre-measurement.

Model training: input the training set and verification set in the database into the collision risk prediction model respectively, and optimize the model parameters.

Model testing: the trained collision risk prediction model is tested using the test set in the database, and the performance of the model is evaluated and analyzed according to the test results.

Collision risk prediction: real-time collection of emergency rescue autonomous driving vehicle data and surrounding moving object data, input into the post-test collision risk prediction model to achieve collision risk prediction.

Further, the construction of the dynamic heterogeneous graph is as follows: the emergency rescue vehicle and its surrounding moving objects represent nodes, and the various interactive relationships between them are expressed as edges, and the nodes and edges dynamically change over time to form a dynamic heterogeneous graph, and its expression is as follows:

$$G^t = (v^t, e^t, u^t)$$

Where $v^t$ is a node set with node type $h \in H$. $e^t$ is an edge set with edge type $r \in R$. $u^t \in \mathbb{R}^{N \times D}$ represents the feature set of all moving objects. H and R are node type set and edge type set, respectively. $\mathbb{R}$ represents real number set. N is the number of nodes. D is the characteristic dimension.

Further, the heterogeneous characteristics of the learning dynamic heterogeneous graph include:

(1) Transfer vector

The initial high-order memory queue is set to be empty, and the type transfer vector accesses each type of surrounding moving object with equal probability. When the surrounding motion object $v_j$ is accessed, its type transfer vector $p_{v_j}$ is updated as follows:

$$p_{v_j} \leftarrow Norm\left(p_{v_j} + Q_{\phi(v_j)}\right)$$

Where $\phi(v_j)$ denotes the type of the surrounding moving object $v_j$, Q represents the first-in, first-out queue, and Norm $(\cdot)$ represents the two-norm of the return vector.

(2) Type conversion. The type of the next surrounding moving object to be accessed is determined according to the probability distribution of $p_{v_j}$, and the type trap problem is solved by using the search mechanism with search factor $\alpha \in [0, 1]$, as follows:

$$Pr(h_{n+1}) = \alpha p_{v_j} + (1 - \alpha)p^0_{v_j}$$

Where, $$p^0_{v_j}$$

represents the surrounding moving object originally accessed by the type transfer vector, and $\Pr(h_{n+1})$ represents the probability that the type of the next surrounding moving object to be accessed is $h_{n+1}$.

(3) High-order memory recording

After accessing the surrounding moving object $v_j$, store the transfer vector $p_{v_j}$ in the next FIFO queue Q:

$$Q'_{\phi(v_j)} \leftarrow Put\left(p_{v_j}, Q_{\phi(v_j)}\right)$$

Where, Put is the queue operator, which means that when the FIFO queue is full, the first transfer vector is popped up and placed at the end of the queue.

Further, learning the dynamic change law of the dynamic heterogeneous graph is as follows:

For emergency rescue vehicle $v_i$, $h_{n+1}$ is used to indicate the type of moving object around it, so there are:

$$N_{n+1}^t(v_i) = \{v_j | (v_i, v_j) \in e^t, \phi(v_j) = h_{n+1}, t \geqq t'\}$$

Where $$N_{n+1}^t(v_i)$$

represents the collection of surrounding moving objects under the future timestamp of the emergency rescue vehicle $v_i$, the t' represents the timestamp of the previous random walk, $e^t$ is the edge set of edge types.

Take an exponential falloff distribution to select the next moving object to access from the collection $$N_{n+1}^t(v_i):$$

$$Pr(v_{n+1}) = \frac{\exp(-\delta \cdot (t - t'))}{\sum_{v_k \in N_{n+1}^t} \exp(-\delta \cdot (t_k - t'))}$$

Where $t_k \in t$, t represents the time stamp, $t_k$ represents the time stamp of the $k^{th}$ step random walk in the future; $\Pr(v_{n+1})$ represents the probability that the next moving object to be visited is $v_{n+1}$, and $v_k$ represents the surrounding moving object visited by the k-step random walk; the discount rate $\delta \in [0,1]$.

Furthermore, the node representation of each surrounding moving object is fuses the output of the high-order memory guided time random walk algorithm with the original characteristics of the surrounding moving objects:

$$x_{v_j}^f = [p_{v_j}][u_{v_j}]W_f$$

$$x_{v_j}^{id} = o_{v_j}^T \cdot E$$

$$x_{v_j} = [x_{v_j}^f][x_{v_j}^{id}] \cdot W$$

Where, $p_{v_j}$, $u_{v_j}$ and $$o_{v_j}^T$$

are the transfer vector, the original feature and the unique thermal vector of the surrounding moving object $v_j$, respectively. $E \in \mathbb{R}^{N \times D}$ is the potential embedding of all moving objects. $\mathbb{R}$ represents the set of real numbers. N is the number of nodes. D is the characteristic dimension. $W_f$ and W represent the learnable parameters that are not shared between the surrounding moving object $v_j$ and other moving objects.

$$x_{v_j}^f, x_{v_j}^{id}$$

and $x_{v_j}$ represent the original feature, the recognition embedded feature and the final node representation of the surrounding moving object, respectively Further, the hierarchical attention graph embedding neural network to predict the collision risk by aggregating different information through node-level attention, edge-level attention and time-level attention.

For node-level attention, when the timestamp is t, for the interaction type r, the importance between the emergency rescue vehicle $v_i$ and its surrounding moving object $v_j$ can be calculated by the following formula:

$$\alpha_{ij}^{rt} = \frac{\exp\left(\sigma\left(a_r^T [U_{nl}^r x_j \| U_{nl}^r x_j]\right)\right)}{\sum_{k \in N_i^{rt}} \exp\left(\sigma\left(a_r^T [U_{nl}^r x_i \| U_{nl}^r x_k]\right)\right)}$$

Where $\sigma$ is the activation function, $x_i$ and $x_j$ are the input representations of the emergency rescue vehicle $v_i$ and the surrounding moving object $v_j$, respectively.

$$U_{nl}^r$$

is a linear transformation matrix. $\|$ indicates the connection.

$$N_i^{rt}$$

represents all the surrounding moving objects of the emergency rescue vehicle $v_i$ of the interaction type r under the timestamp t. $a_r$ is a weight vector and $$a_r^T$$

is the transpose of $a_r$. $x_k$ represents the $k^{th}$ moving object around the car.

The node embedding $$g_i^{rt}$$

of the emergency rescue vehicle $v_i$ with the interaction type r under the timestamp t can be obtained:

$$g_i^{rt} = \sigma\left(\sum_{v_j \in N_i^{rt}} \alpha_{ij}^{rt} U_{nl}^{r} v_j\right)$$

For marginal attention, the attention mechanism is used to learn the importance $$\beta_i^{rt}$$

of different types of interactions, and calculated by multi-layer perceptrons:

$$\beta_i^{rt} = \frac{\exp\left(w^T \cdot \sigma(U_{el} g_i^{rt} + b_{el})\right)}{\sum_{l=1}^{R} \exp\left(w^T \cdot \sigma\left(U_{el} g_i^{lt} + b_{el}\right)\right)}$$

Where $w^T$ is the edge-level attention vector, and $U_{el}$ and $b_{el}$ are the single-layer parameters of multi-layer perceptrons. R is the set of edge types.

The fusion embedding $$g_i^t$$

of $v_i$ for the emergency vehicle considering the importance of different types of interaction can be expressed as:

$$g_i^t = \sum_{r=1}^{R} \beta_i^{rt} \cdot g_i^{rt}$$

For time-level attention, the fusion embedding of the emergency rescue vehicle under all timestamps is aggregated and packaged to $G_i \in \mathbb{R}^{T \times D}$ T represents the number of historical timestamps used to predict collision risk. Then calculate the fused embedded query-key-value vector:

$$P = G_i \cdot U_P$$

$$K = G_i \cdot U_K$$

$$V = G_i \cdot U_V$$

Where P, K and V represent query, key and value vector respectively, and $U_P$, $U_K$ and $U_V$ represent the corresponding matrixes that convert $G_i$ into query, key and value vector. D is the characteristic dimension. $\mathbb{R}$ represents the set of real numbers Use the softmax function to calculate time-level attention:

$$Z_i = \text{softmax}\left(\frac{PK^T}{\sqrt{D'}} + M\right) \cdot V$$

Where $Z_i$ represents time-level attention, $M \in R^{T \times T}$ is a mask matrix, and D' is the dimension of the query-key-value vector.

By using $Z_i^T$ as the final embedding fusion, the collision risk can be calculated:

$$Y = \text{softmax}\left(W_2 \cdot ReLU\left(W_1 \cdot Z_i^T + b_1\right) + b_2\right)$$

Where, softmax $(\cdot)$ is the output activation function. $W_1$ and $W_2$ are weight matrixes of the hierarchical attention graph embedding neural network. ReLU $(\cdot)$ is the activation function, and $b_1$ and $b_2$ represent the offset term.

Furthermore, the attention positioning space is used to determine the application position of attention in the hierarchical attention graph embedding neural network.

The type of surrounding moving object, the type of interaction and the number of timestamps are selected through the matrix $A^{Lo}$. The specific calculations are as follows:

$$A^{LO} = \{0, 1\}^{T \times T \times |R|}$$

When the timestamp is t, the matrix $$A_{t,t',r}^{LO}$$

is used to determine whether it is necessary to pay attention to surrounding moving objects $$N_i^{rt'}$$

with interaction type r.

$$N_i^{rt'}$$

represents all the surrounding moving objects of the emergency rescue vehicle $v_i$ of interaction type r under the timestamp t'.

By using attention positioning space, the time complexity is:

$$O\left(\sum_{t=1}^{T} \sum_{t'=1}^{T} \sum_{r \in R} A_{t,t',r}^{LO} \left|e_r^{t'}\right|\right) = O\left(\left|A^{LO}\right| \max_{1 \le t \le T, r \in R} \left|e_r^t\right|\right)$$

Where, $|A^{Lo}|$ represents the number of non-zero values in $A^{Lo}$. T represents the number of historical timestamps used to predict collision risk.

$$\left|e_r^{t'}\right| \text{ and } \left|e_r^t\right|$$

represent the number of interactions of type r under timestamps t' and t, respectively. O $(\cdot)$ represents time complexity. |R| indicates the number of edge types.

Furthermore, the attention parameterized space is used to determine the calculation mode of attention function in the hierarchical attention graph embedding neural network.

Use the attention parameterization space $A^{P\alpha}$ to search for the attention function, the expression is as follows:

$$A^{Pa} = A^N \times A^R$$

Where $A^N=\{1, \ldots, K_N\}^{T\times|H|}$ is the parameterized matrix of the node mapping function $F^N(\cdot)$. $A^R=\{1, \ldots, K_R\}^{2T\times|R|}$ is the parameterized matrix of the edge mapping matrix $F^R(\cdot)$. $K_N$ and $K_R$ are two superparameters. |H| indicates the number of node types.

Furthermore, multi-stage differential search is used to reduce the complexity of parameter search in location space and parameter space:

a) Spatial constraints

The following two constraints are introduced to reduce the search scope and limit complexity: firstly, the emergency rescue vehicle can only accept information from surrounding moving objects from historical time. Secondly, $$|A_t^{LO}| \leqq K_{L_O}$$

is used to constrain the number of surrounding moving objects and interactive relationships for collision risk prediction under each timestamp, where $K_{L_O}$ is a super parameter, $1 \le t \le T$.

b) Supernet Construction

Using supernet to transform parameter search in location space and parameterized space into a neural structure search problem. Specifically, the selection of the operation is expressed as a probability distribution:

$$\overline{F}(x) = \sum\nolimits_{i=1}^{|A|} \frac{\exp(\beta_i)}{\sum\nolimits_{i=1}^{|A|} \exp(\beta_j)} F_i(x)$$

Where x is input. $\overline{F}(x)$ output. |A| indicates the number of operations. $\beta_i$ represents the mixed weight of the mapping function $F_i(\cdot)$ corresponding to the $i^{th}$ operation.

By using supernet, all the parameters in the mixed weight $\beta$ and mapping function are optimized in a differentiable way:

$$w \leftarrow w - \eta_w \frac{\partial \mathcal{L}_{train}}{\partial w},\ \beta \leftarrow \beta - \eta_\beta \frac{\partial \mathcal{L}_{val}}{\partial \beta}$$

Where $\eta_w$ and $\eta_\beta$ represent the learning rate of structural weight and model weight respectively. $\mathcal{L}_{train}$ and $\mathcal{L}_{val}$ represent the loss function of training set and verification set respectively. w represents structural weight and $\beta$ represents model weight.

c) Multi-stage supernet training:

In order to stabilize the supernet training, the training process is divided into three stages: moving object parameterization, interaction parameterization and attention location space search, each stage focuses on different parameterized space.

A collision risk prediction system of emergency rescue autonomous driving vehicle based on HM-TRW and HAGENN structure search:

Data acquisition equipment, including vehicle sensors, roadside equipment and communication technology, for collecting self-vehicle data and surrounding moving object data.

Data preprocessing module, used for cleaning, normalization, feature extraction, data reduction and data set division of the collected data.

The prediction model, including a high-order memory guided time random walk algorithm, a hierarchical attention graph embedding neural network and an optimal parameter search module. The optimal parameter search module includes attention positioning space, attention parameterization space and multi-stage differential search module.

The visualization module, used to display the predicted collision risk.

Advantages of the present disclosure include:

1. This application constructs a dynamic heterogeneous diagram of the interaction between emergency rescue vehicles and surrounding moving objects, which can better learn different types of moving objects and the complex dynamic relationship between them. In addition, the dynamic heterogeneous map can also capture the static and dynamic characteristics of the surrounding moving objects at the same time, thus providing more comprehensive and accurate collision risk prediction results. Specifically, it learns the position changes of each moving object under different timestamps according to the time series data of the self-vehicle and the surrounding moving objects. Finally, the dynamic heterogeneous graph has strong reliability and generalization ability, can automatically adapt to a variety of complex traffic environments, and can deal with a variety of dynamic interactions.
2. This application adopts high-order memory guided time random walk algorithm and hierarchical intention embedding neural network to further learn the importance of surrounding moving objects and their interaction with emergency rescue vehicles. The high-order memory guided time random walk algorithm can make full use of the historical data and non-decreasing time constraints of the surrounding moving objects to consider the moving objects with great influence on the corresponding emergency aid vehicles, so as to predict the collision risk more accurately and efficiently. At the same time, the hierarchical attention graph embedding neural network uses the hierarchical attention layer to capture the importance of each surrounding moving object to the emergency rescue vehicle and the importance of various interactions between the two, which further improves the accuracy of the prediction. At the same time, the future collision risk is calculated by combining the important features under the historical timestamp.
3. In this application, attention positioning and parameterized space are constructed to improve the computational efficiency of the model, and a multi-stage differentiable search algorithm is used to further accelerate the calculation of the model. In the actual collision risk prediction, emergency rescue vehicles need to consider the spatio-temporal characteristics of all the surrounding moving objects, and calculate the importance of various interactive relationships to pay attention to the interactive characteristics that have a greater impact on the collision risk, so the calculation cost is very high. In order to achieve efficient and accurate collision risk prediction, it is necessary to adopt a more lightweight and efficient model architecture. Attention location space and parameterized space can flexibly determine the application location and calculation function of attention. The multi-stage differentiable search algorithm can screen the invalid model architecture by using heuristic constraints and use a single neural architecture search algorithm to determine the optimal architecture.

DETAILED DESCRIPTION OF THE EMBODIMENTS

Figure 1:
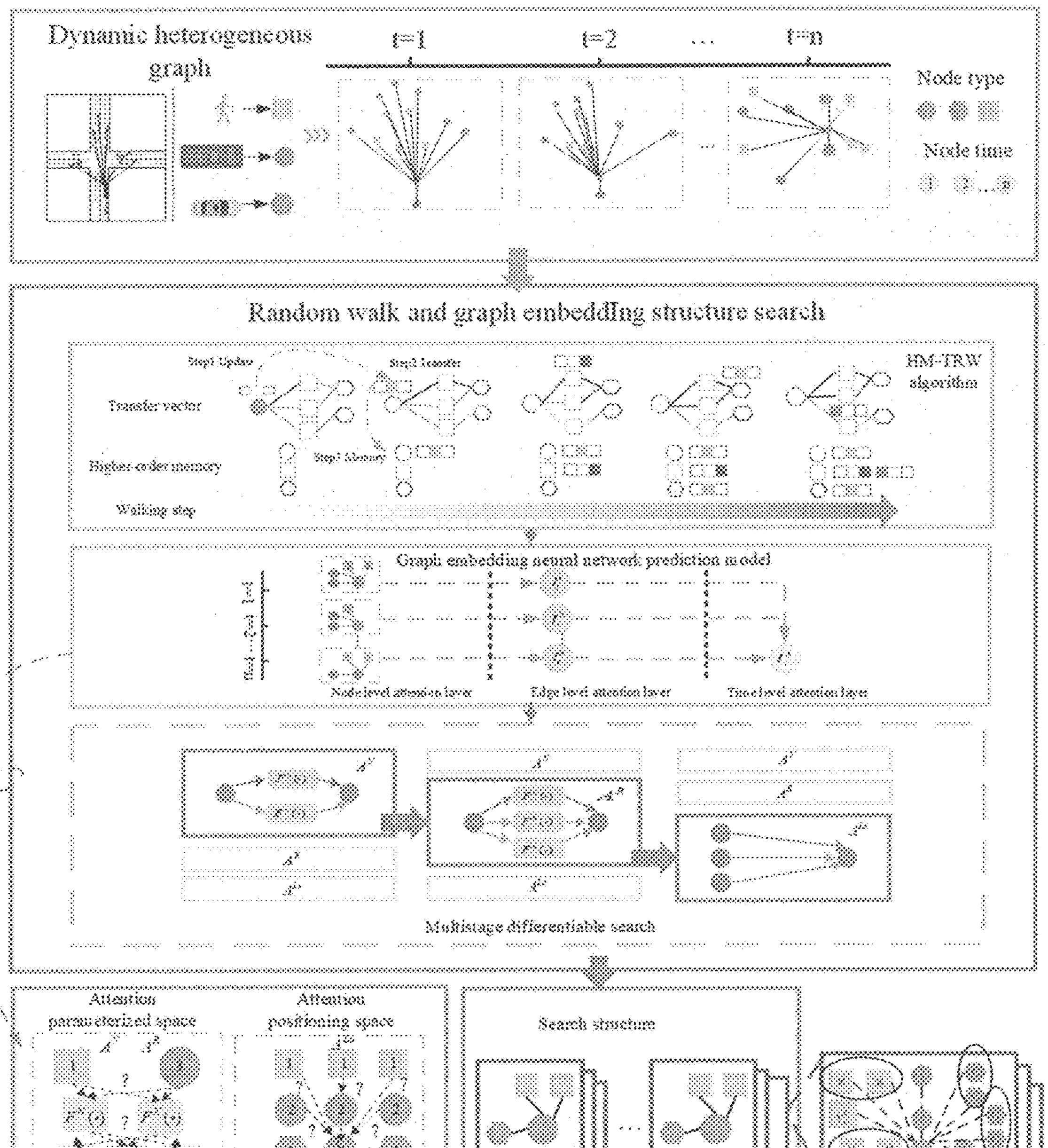
FIG. 1 is a frame diagram of the structure search model based on HM-TRW and HAGENN of the present disclosure.
Figure 2:
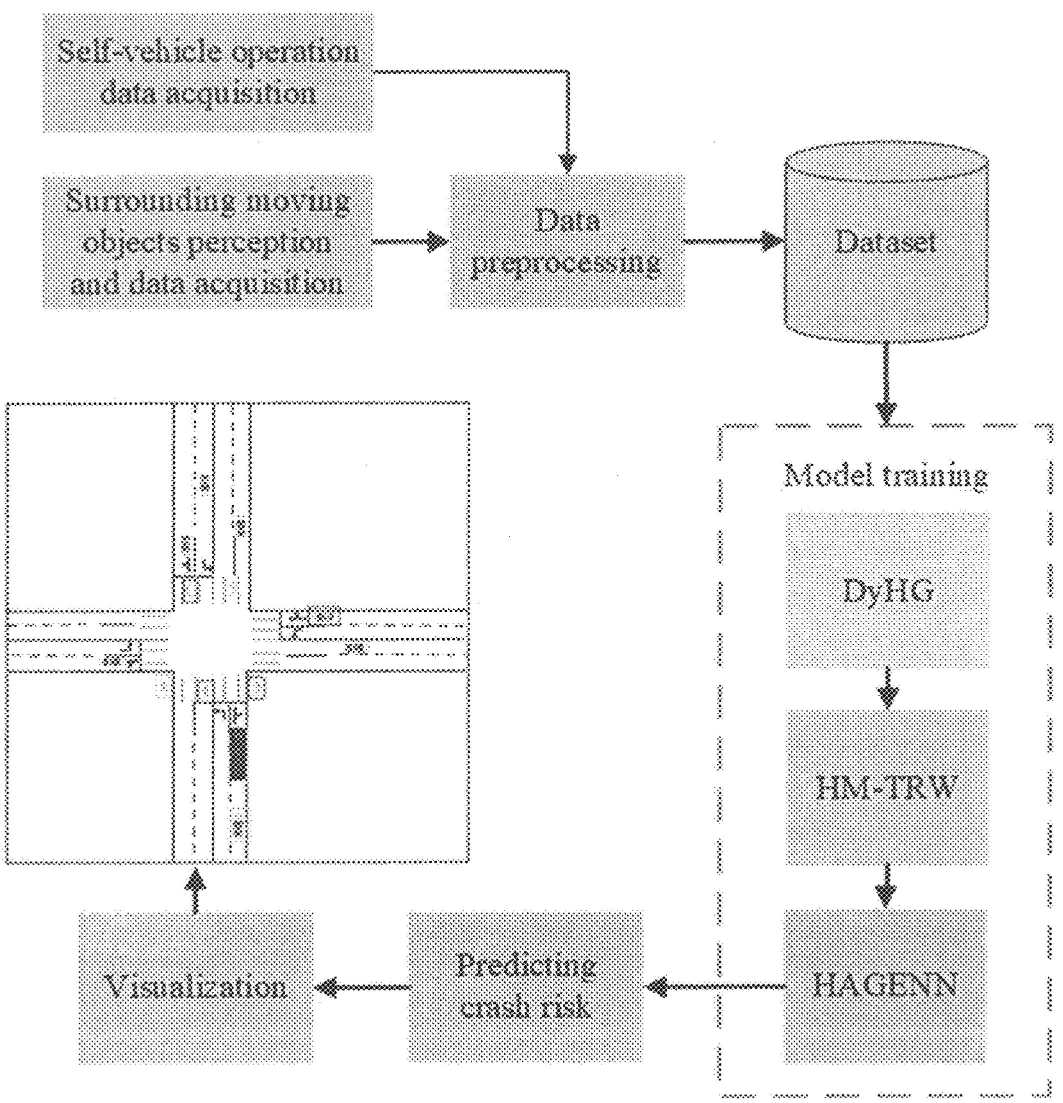
FIG. 2 is the flow chart of the emergency rescue autonomous driving vehicle collision wind risk prediction method based on the HM-TRW and HAGENN structure search of the present disclosure.

Referring to FIGS. 1 and 2, the emergency rescue autonomous driving vehicle collision risk prediction system based on HM-TRW and HAGENN structure search includes data acquisition equipment, data preprocessing module, prediction model and visualization module.

The data acquisition equipment includes on-board sensors (laser radar, acceleration sensor, speed sensor, steering angle sensor, GPS, camera, etc.), roadside equipment (camera and speed radar, etc.) and communication technology (vehicle-vehicle communication technology and vehicle-infrastructure communication technology) in real vehicle experiments, which are used for collecting self-vehicle data and surrounding moving object data. The self-vehicle data collected are mainly the speed, acceleration, steering angle, yaw angular speed, pedal strength and energy consumption of the self-vehicle; the surrounding moving object data are mainly the position, speed, acceleration and trajectory of the vehicles around the emergency rescue autonomous driving vehicle and vulnerable traffic groups.

The data preprocessing module is mainly used for cleaning, normalization, feature extraction, data reduction and data set division of the collected original data, so that the prediction model can learn better; the preprocessed data is stored in the database. The specific steps for preprocessing are as follows:

(1) Data Cleaning: remove duplicate data, noisy data and irrelevant data, fill in missing values and delete outliers.

(2) Data Normalization: the vehicle operation and pedestrian movement data of different dimensions are transformed into a unified format, which is convenient for subsequent processing and analysis.

(3) Feature Extraction: important features are selected through feature importance analysis for collision risk prediction.

(4) Data Dimensionality Reduction: reduce the dimensionality of high-dimensional data by principal component analysis, reduce the computational complexity and memory consumption, retain the main characteristic information, and improve the efficiency and accuracy of collision risk prediction.

(5) Dataset Partition: the data in the database is divided into training set, verification set and test set, and the training set is used to train the model; the verification set is used to optimize the prediction performance of the model, calculate the prediction error and constantly adjust the model parameters to make the collision risk prediction reach a specific accuracy. The test set is used to evaluate and analyze the accuracy and generalization ability of the model. The former is evaluated by accuracy index and AUC curve (area under the curve), while the latter evaluates the stability of model prediction by inputting data from different traffic scenarios (such as signalized intersection, unsignalized intersection, roundabout, confluence area, etc.). Training sets, validation sets, and test sets are divided into 70%, 20%, and 10%.

The prediction model is composed of a random walk algorithm, a hierarchical attention graph embedding neural network and an optimal parameter search module. The random walk algorithm adopts high-order memory and non-decreasing time constraint strategy to capture the importance and dynamics of the surrounding moving objects. The hierarchical attention graph embedding neural network includes three levels: node-level attention, marginal attention and time-level attention. the first two levels learn the importance of each surrounding moving object to the emergency rescue vehicle and the importance of various interactions between them, and the last level aggregates the important features learned under the historical timestamp to calculate the collision risk. The optimal parameter search module includes attention positioning space and attention parameterization space, and also includes a multi-stage differential structure search module, which is used to speed up the calculation of attention in hierarchical graph embedding and improve the efficiency of collision risk prediction.

The visualization module is used to display the predicted collision risk so that the driver can take appropriate risk aversion measures in time.

Figure 4:
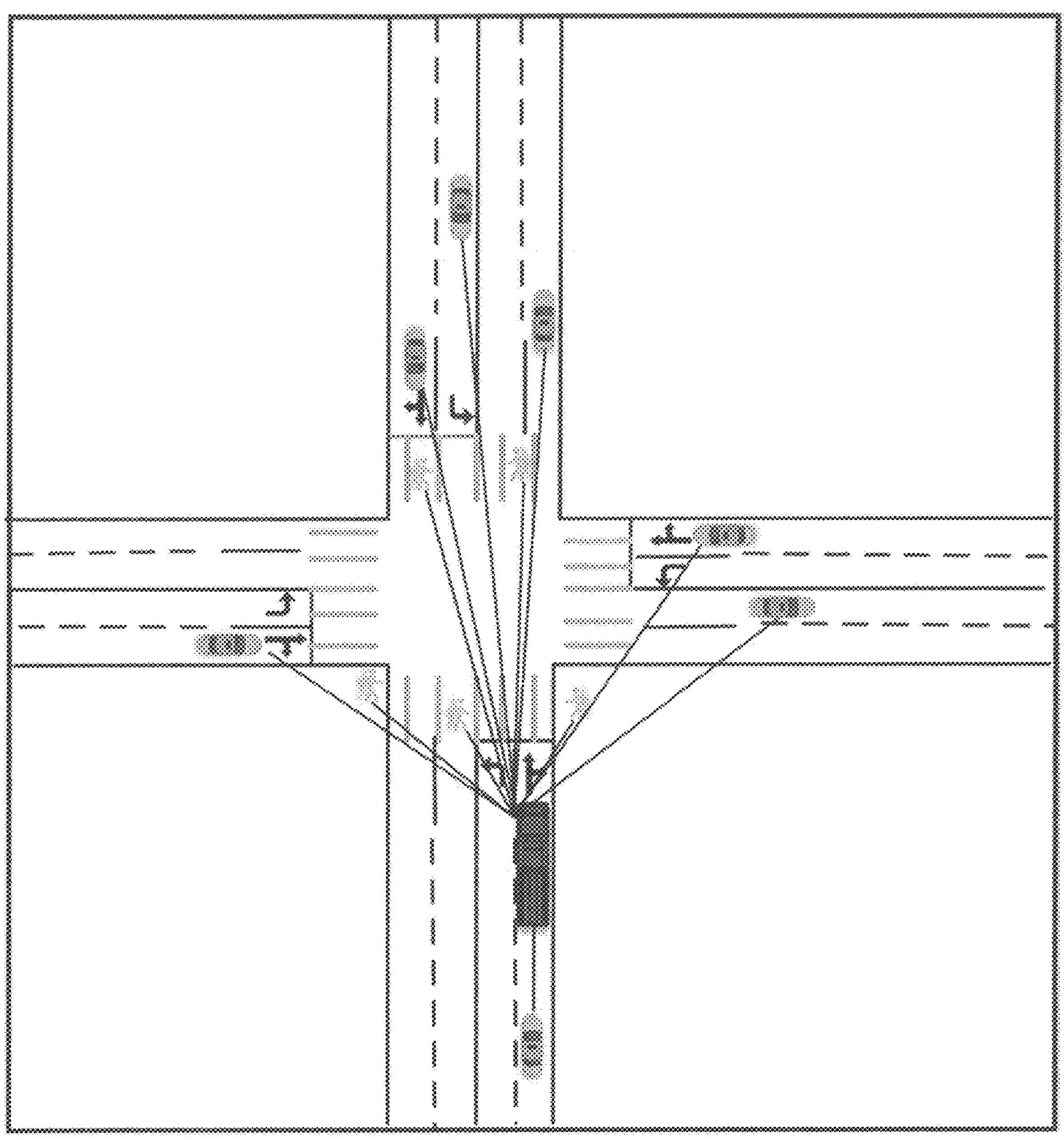
FIG. 4 is an example diagram of the interaction between an emergency rescue vehicle and other moving objects in the original traffic scene of the present disclosure.
Figure 5:
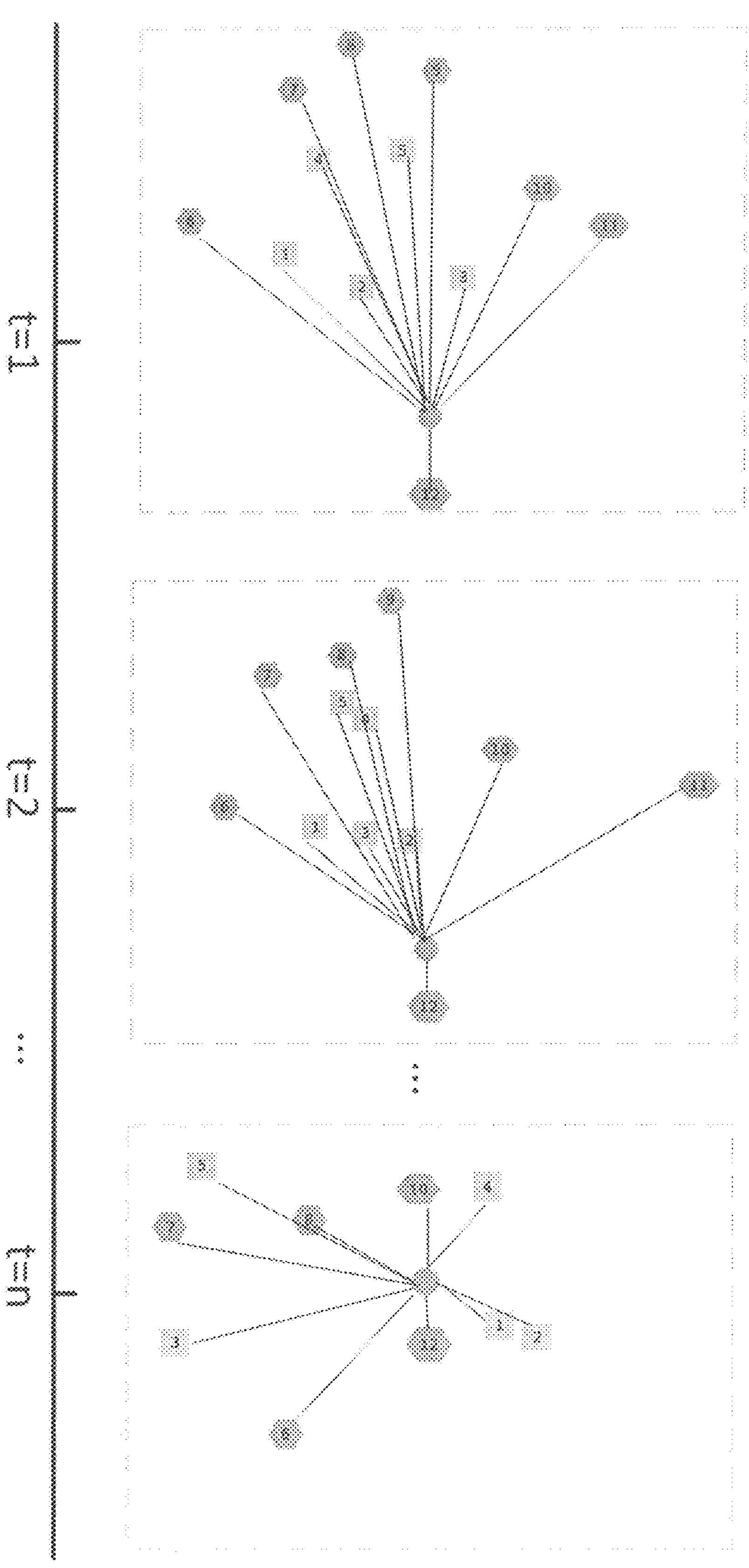
FIG. 5 is a dynamic heterogeneous diagram of the interaction between the emergency rescue autonomous driving vehicle and the surrounding moving objects in the present disclosure.
Figure 6:
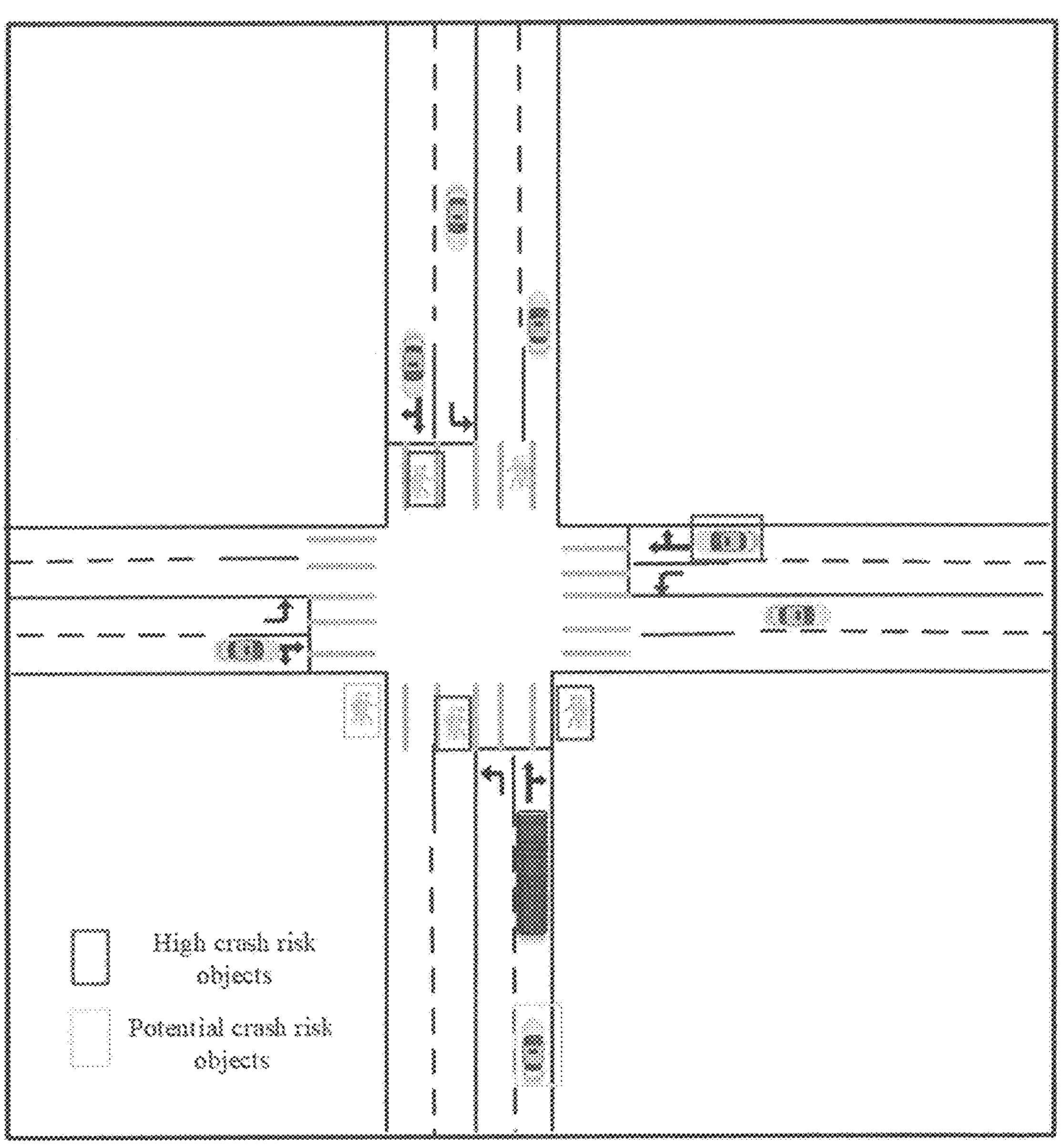
FIG. 6 is an example diagram of a scenario for collision risk prediction of the emergency rescue autonomous driving vehicle described in the present disclosure.

The emergency rescue autonomous driving vehicle collision risk prediction method, mainly rely on high-order memory guided time random walk and hierarchical attention graph embedding neural network to achieve efficient and accurate collision risk prediction. The construction process of the model is as follows:

(1) Dynamic Heterogeneous Graph (DyHG) Construction: all moving objects (including emergency rescue vehicles and their surrounding moving objects) represent nodes, and the various interactive relationships between them (such as proximity trend, competition, cooperation, etc.) are represented as edges (refer to FIG. 4), and the nodes and edges dynamically change over time to form a dynamic heterogeneous graph (see FIG. 5). The expression is as follows:

$$G^t=(v^t,e^t,u^t)$$

Where $v^t$ is a node set with node type $h \in H$ (including surrounding moving object types). $e^t$ is an edge set with edge type $r \in R$. $u^t \in \mathbb{R}^{N \times D}$ represents the feature set of all moving objects (such as velocity, acceleration, trajectory, etc.). H and R are node type set and edge type set, respectively. |H| and |R| represent the number of node types and edge types. $\mathbb{R}$ represents real number set. N is the number of nodes. D is the characteristic dimension.

(2) High-order Memory Guided Time Random Walk (HM-TRW): when the emergency rescue vehicle carries on the collision risk prediction, the importance of the surrounding moving object is different, and the different interaction between the emergency rescue vehicle and the emergency rescue vehicle is different, so it is necessary to consider this heterogeneous characteristic. At the same time, the surrounding moving objects are constantly changing in the driving process of the emergency rescue vehicle, and the interactive relationship with the emergency rescue vehicle is also changed accordingly, which will greatly increase the complexity of the dynamic heterogeneous graph structure, so this dynamic characteristic should also be considered. Therefore, the high-order memory guided time random walk algorithm is introduced.

Firstly, heterogeneous characteristics are learned through high-order memory guidance, where high-order memory stores first-in, first-out queues of different types of surrounding moving objects, the specific steps are as follows:

Step 1: Transfer vectors. The initial high-order memory queue is set to be empty, and the type transfer vector visits each type of surrounding moving object with equal probability. When the surrounding motion object $v_j$ is visited, its type transfer vector $p_{v_j}$ is updated as follows:

$$p_{v_j} \leftarrow Norm\left(p_{v_j} + Q_{\phi(v_j)}\right)$$

Where $\phi(v_j)$ denotes the type of the surrounding moving object $v_j$, Q represents the first-in, first-out queue, and Norm $(\cdot)$ represents the two-norm of the return vector.

Step 2: Type conversion. The type of the next surrounding moving object to be visited is determined according to the probability distribution of $p_{v_j}$ in step1, and the type trap problem is solved by using the search mechanism with search factor $\alpha \in [0, 1]$, as follows:

$$Pr(h_{n+1}) = \alpha p_{v_j} + (1-\alpha) p_{v_j}^0$$

Where, $$p_{v_j}^0$$

represents the surrounding moving object originally visited by the type transfer vector, and $Pr(h_{n+1})$ represents the probability that the type of the next surrounding moving object to be visited is $h_{n+1}$.

Step 3: high-order memory recording. After visiting the surrounding moving object $v_j$, store the transfer vector $p_{v_j}$ in the next FIFO queue:

$$Q'_{\phi(v_j)} \leftarrow Put\left(p_{v_j}, Q_{\phi(v_j)}\right)$$

Where, Put is the queue operator, which means that when the FIFO queue is full, the first transfer vector is popped up and placed at the end of the queue.

Secondly, the dynamic change law of dynamic heterogeneous graph is learned by non-decreasing time constraint. For emergency rescue vehicle $v_i$ (self-vehicle), $h_{n+1}$ is used to indicate the type of moving object around it, so there are:

$$N_{n+1}^t(v_i) = \{v_j \mid (v_i, v_j) \in e^t, \phi(v_j) = h_{n+1}, t \geqq t'\}$$

Where $$N_{n+1}^t(v_i)$$

represents the collection of surrounding moving objects under the future timestamp of the emergency rescue vehicle $v_i$. t' represents the time stamp of the previous random walk. $\phi(v_j)$ represents the type of surrounding moving objects $v_j$.

Take an exponential falloff distribution to select the next moving object to visit from the collection $$N_{n+1}^t(v_i):$$

$$Pr(v_{n+1}) = \frac{\exp(-\delta \cdot (t - t'))}{\sum_{v_k \in N_{n+1}^t} \exp(-\delta \cdot (t_k - t'))}$$

Where $t_k \in t$, t represents the time stamp, $t_k$ represents the time stamp of the $k^{th}$ step random walk in the future; $Pr(v_{n+1})$represents the probability that the next moving object to be visited is $v_{n+1}$, and $v_k$ represents the surrounding moving object visited by the k-step random walk; the discount rate $\delta$ E$\in$ [0,1], which is used to correct the time probability distribution.

Finally, the output of the high-order memory guided time random walk algorithm is integrated with the original characteristics of the surrounding moving objects, and their respective node representations are obtained:

$$x_{v_j}^f = [p_{v_j}][u_{v_j}]W_f$$

$$x_{v_j}^{id} = o_{v_j}^T \cdot E$$

$$x_{v_j} = \left[x_{v_j}^f\right]\left[x_{v_j}^{id}\right] \cdot W$$

Where, $$x_{v_j}^f, x_{v_j}^{id}$$

and $x_{v_j}$ represent the original feature, the recognition embedded feature and the final node representation of the surrounding moving object, respectively. $p_{v_j}$, $u_{v_j}$ and $$o_{v_j}^T$$

are the transfer vector, the original feature and the unique thermal vector of the surrounding moving object $v_j$, respectively. $E \in \mathbb{R}^{N \times D}$ is the potential embedding of all moving objects. $W_f$ and W represent the learnable parameters that are not shared between the surrounding moving object $v_j$ and other moving objects. $x_{v_j}$ represents the node representation of the surrounding moving object $v_j$ of the input hierarchical attention graph embedding neural networks.

(3) Hierarchical Attention Graph Embedding Neural Networks (HAGENN): the node representation of the surrounding moving objects obtained by the high-order memory guided time random walk algorithm is then fed to the hierarchical attention graph embedding neural network to predict the collision risk, and further capture the importance and time evolution trend of the surrounding moving objects and interactive relations, so as to improve the efficiency and accuracy of prediction. Specifically, different information is aggregated through node-level attention, edge-level attention and time-level attention.

For node-level attention, when the timestamp is t, for the interaction type r, the importance between the emergency rescue vehicle $v_i$ and its surrounding moving object $v_j$ can be calculated by the following formula:

$$\alpha_{ij}^{rt} = \frac{\exp\left(\sigma\left(a_r^T [U_{nl}^r x_j \| U_{nl}^r x_j]\right)\right)}{\sum_{k \in N_i^{rt}} \exp\left(\sigma\left(a_r^T [U_{nl}^r x_i \| U_{nl}^r x_k]\right)\right)}$$

Where σ is the activation function, $x_i$ and $x_j$ are the input representations of the emergency rescue vehicle $v_i$ and the surrounding moving object $v_j$, respectively.

$$U_{nl}^r$$

is a linear transformation matrix. || indicates the connection.

$$N_i^{rt}$$

represents an the surrounding moving objects of the emergency rescue vehicle $v_i$ of the interaction type r under the timestamp t. $a_r$. is a weight vector, which parameterizes the attention function of the interaction type r and $$a_r^T$$

is the transpose of $a_r$.. $x_k$ represents the $k^{th}$ moving object around the car. Thus, the node embedding of the emergency rescue vehicle $v_i$ with the interaction type r under the timestamp t can be obtained:

$$g_i^{rt} = \sigma\left(\sum_{v_j \in N_i^{rt}} \alpha_{ij}^{rt} U_{nl}^r v_j\right)$$

For marginal attention, the attention mechanism is used to learn the importance of different types of interactions and calculated by multi-layer perceptrons:

$$\beta_i^{rt} = \frac{\exp\left(w^T \cdot \sigma(U_{el} g_i^{rt} + b_{el})\right)}{\sum_{l=1}^{R} \exp\left(w^T \cdot \sigma\left(U_{el} g_i^{lt} + b_{el}\right)\right)}$$

Where σ is the activation function, $w^T$ is the edge-level attention vector, and $U_{el}$ and $b_{el}$ are the single-layer parameters of multi-layer perceptrons. The fusion embedding of the emergency rescue vehicle $v_i$ considering the importance of different types of interaction can be expressed as:

$$g_i^t = \sum_{r=1}^{R} \beta_i^{rt} \cdot g_i^{rt}$$

For time-level attention, the fusion embedding of the emergency rescue vehicle under all timestamps is aggregated and packaged to $G_i \in \mathbb{R}^{T \times D}$, T represents the number of historical timestamps used to predict collision risk. Then calculate the fused embedded query-key-value vector:

$$P = G_i \cdot U_P$$
$$K = G_i \cdot U_K$$
$$V = G_i \cdot U_V$$

Where P, K and V represent query, key and value vector respectively, and $U_p$, $U_K$ and $U_V$ represent the corresponding matrixes that convert $G_i$ into query, key and value vector.

Use the softmax function to calculate time-level attention:

$$Z_i = \text{softmax}\left(\frac{PK^T}{\sqrt{D'}} + M\right) \cdot V$$

Where $Z_i$ represents time-level attention, $M \in R^{T \times T}$ is a mask matrix, and D' is the dimension of the query-key-value vector. By using $Z_i^T$ as the final embedding fusion, the collision risk can be calculated:

$$Y = \text{softmax}\left(W_2 \cdot ReLU\left(W_1 \cdot Z_i^T + b_1\right) + b_2\right)$$

Where, softmax (·) is the output activation function. $W_1$ and $W_2$ are weight matrixes of the hierarchical attention graph embedding neural network. ReLU (·) is the activation function. $b_1$ and $b_2$ represent the offset term.

(4) Attention positioning and Parameterization Space: the hierarchical attention graph embedding neural network needs to calculate the attention between different moving objects, different interactions and different timestamps when predicting collision risk, and the computational cost is high. This will lead to the inefficiency of pre-prediction, so that the collision risk cannot be predicted in time. In order to achieve a more efficient architecture, attention positioning and parameterized space are proposed to sparse attention.

a) Attention Positioning:

Before using attention positioning space, the time complexity of hierarchical attention graph embedding is shown in the following formula:

$$O\left(\sum_{t=1}^{T}\sum_{t'=1}^{T}\sum_{r\in R}|e_r^{t'}|\right) = O\left(T^2|R|\max_{1\leq t\leq T, r\in R}|e_r^t|\right)$$

Where T represents the number of historical timestamps used to predict collision risk.

$$|e_r^{t'}|$$

and $$|e_r^t|$$

represent the number of interactions of type r under timestamps t' and t, respectively. O (·) represents time complexity.

The type of surrounding moving object, the type of interaction and the number of timestamps can be selected through the matrix $A^{Lo}$. The specific calculations are as follows:

$$A^{LO} = \{0, 1\}^{T\times T\times|R|}$$

Further, when the timestamp is t, the matrix $$A_{t,t',r}^{LO}$$

can determine whether it is necessary to pay attention to surrounding moving objects with interaction type r (all surrounding moving objects of emergency rescue vehicle $v_i$ with interaction type r under time stamp t'). The specific formula is as follows:

$$A_{t,t',r}^{LO} = \{0, 1\}^{t\times t'\times r}$$

Thus, it can be said that $A^{Lo}$ completely determines where the attention function is applied. By using attention to locate space, the time complexity has been greatly reduced:

$$O\left(\sum_{t=1}^{T}\sum_{t'=1}^{T}\sum_{r\in R}A_{t,t',r}^{LO}|e_r^{t'}|\right) = O\left(|A^{LO}|\max_{1\leq t\leq T, r\in R}|e_r^t|\right)$$

Where, $|A^{Lo}|$ represent the number of non-zero values in $A^{Lo}$. By controlling the total number, the temporal complexity of hierarchical attention graph embedding can be reduced to independent of T and |R|.

b) Parametric Space:

In order to further reduce the number of parameters, a parametric space is proposed to search the formula of the attention function. The expression of the parameterized space is as follows:

$$A^{Pa} = A^N \times A^R$$

Where $A^N=\{1, \ldots, K_N\}^{T\times|H|}$ is the parameterized matrix of the node mapping function $F^N(\cdot)$. $A^R=\{1, \ldots, K_R\}^{2T\times|R|}$ is the parameterized matrix of the edge mapping matrix $F^R(\cdot)$. $K_N$ and $K_R$ are two superparameters. The mapping functions of surrounding moving objects and interactions are selected from $A^N$ and $A^R$, respectively.

By using the above parameterized space, the shared parameters suitable for similar traffic scenes and rescue tasks can be searched and learned adaptively. In addition, using parametric space can also reduce the number of learnable parameters. The number of learnable parameters of original hierarchical attention graph embedding neural network can be expressed as O(T|H|+|R|), which can be reduced to $O(K_N+K_R)$ by using parameterized space. When $K_N$ and $K_R$ are constrained to constant, the number of learnable parameters becomes a constant.

(5) Multi-stage Differential Search: in order to further reduce the complexity of parameter search in positioning space and parameter space and realize efficient collision risk prediction, heuristic constraints are proposed to remove invalid structures in search space. and a neural structure search algorithm is used to speed up the search process.

a) Spatial Constraints: two constraints are introduced to reduce the search scope and limit complexity: firstly, the emergency rescue vehicle can only accept information from surrounding moving objects from historical time. Secondly, $$\left|A_t^{LO}\right| \leqq K_{LO},\ 1 \leqq t \leqq T$$

is used to constrain the number of surrounding moving objects and interactive relationships for collision risk prediction under each timestamp, where $K_{L_O}$ is a super parameter.

b) Supernet Construction: using supernet to transform parameter search in positioning space and parameterized space into a neural structure search problem. Specifically, the selection of the operation is expressed as a probability distribution:

$$\overline{F}(x) = \sum_{i=1}^{|A|}\frac{\exp(\beta_i)}{\sum_{j=1}^{|A|}\exp(\beta_j)}F_i(x)$$

Where x is input. $\overline{F}(x)$ output. |A| indicates the number of operations. $\beta_i$ represents the mixed weight of the mapping function $F_i(\cdot)$ corresponding to the $i^{th}$ operation. Here, the choice of operation represents the application of attention function or the selection of moving objects or interactive relationships.

By using supernet, all the parameters in the mixed weight β and mapping function are optimized in a differentiable way:

$$w \leftarrow w - \eta_w \frac{\partial \mathcal{L}_{train}}{\partial w},\ \beta \leftarrow \beta - \eta_\beta \frac{\partial \mathcal{L}_{val}}{\partial \beta}$$

Where $\eta_w$ and $\eta_\beta$ represent the learning rate of structural weight and model weight respectively. $\mathcal{L}_{train}$ and $\mathcal{L}_{val}$ represent the loss function of training set and verification set respectively. w represents structural weight and β represents model weight.

- c) Multi-stage supernet training: in order to stabilize the supernet training, the training process is divided into three stages: moving object parameterization, interaction parameterization and attention positioning space search, each stage focuses on different parameterized space.

Figure 3:
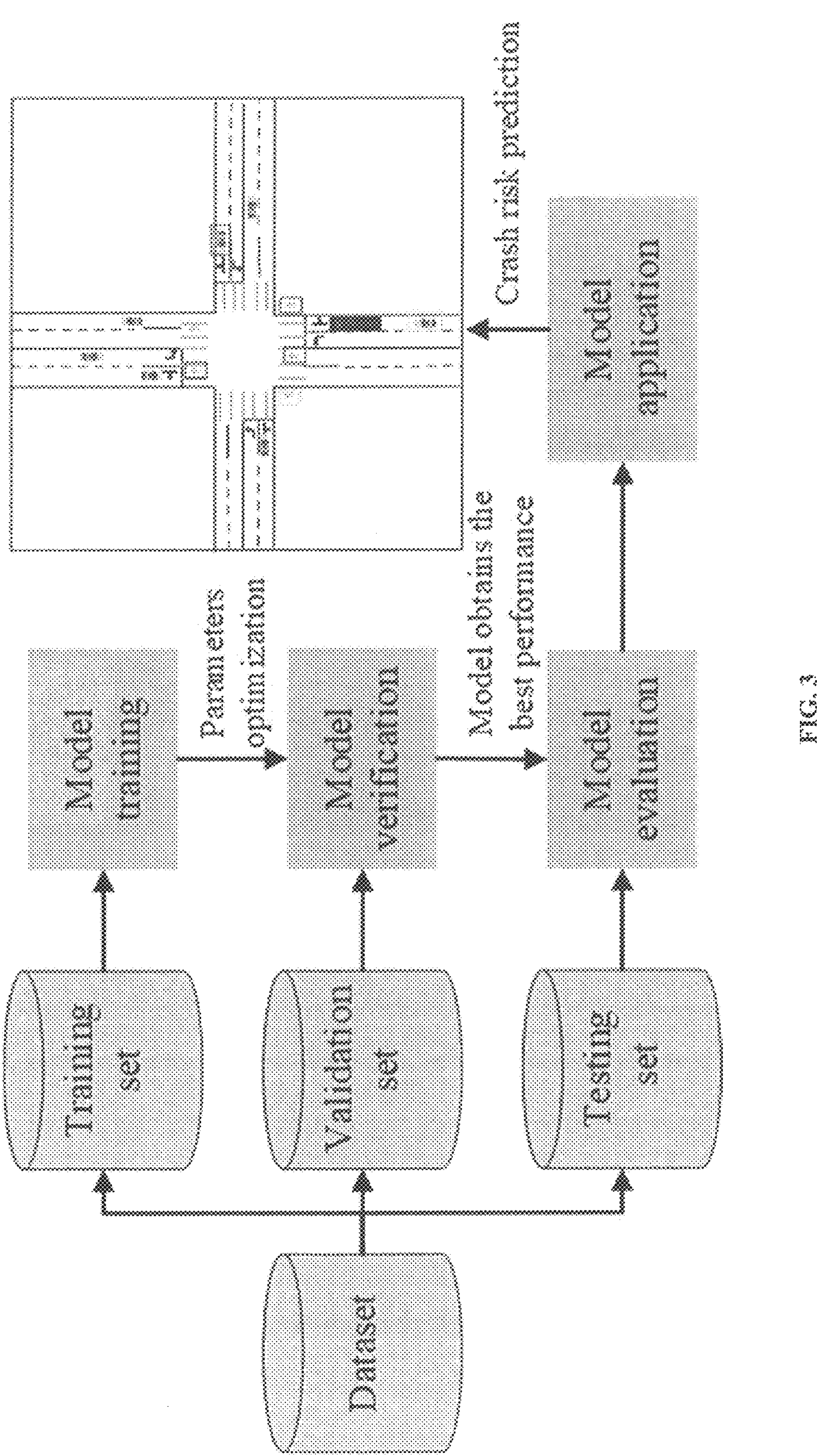
FIG. 3 is a flowchart of the model training and verification of the present disclosure.

Referring to FIG. 3, before the actual collision risk prediction, it is necessary to train and verify the model, and constantly adjust and optimize the model parameters to make it have the best prediction performance. Then, the prediction performance of the model is evaluated and analyzed using test set data. Finally, the prediction model is applied to the actual traffic scene and the collision risk prediction results can be visualized.

Further, the process of model training and verification is as follows:

- (1) Data Input: the feature vectors of self-vehicle data and surrounding moving object data are extracted from the divided training set as the input of the model.
- (2) Model Training: high-order memory guided time random walk algorithm and hierarchical attention graph embedding neural network learn the importance of different moving objects and their interactions, and the latter predicts the collision wind risk distribution under the current timestamp according to the historical data.
- (3) Model Evaluation: calculate the difference between the predicted collision risk and the actual collision risk.
- (4) Parameter Optimization: according to the evaluation results of the model, the optimizer is used to optimize and update the model parameters so as to reduce the prediction error.
- (5) Iterative: perform the above steps (2)~(4) repeatedly, use different training sample groups to train the model iteratively, and update the model parameters at the end of each iteration.
- (6) Model verification: in the process of training, the verification set is used periodically to evaluate the model performance, monitor the generalization ability and prediction accuracy of the model, and adjust the model hyperparameters according to the verification results to obtain the best model performance.

Figure 7:
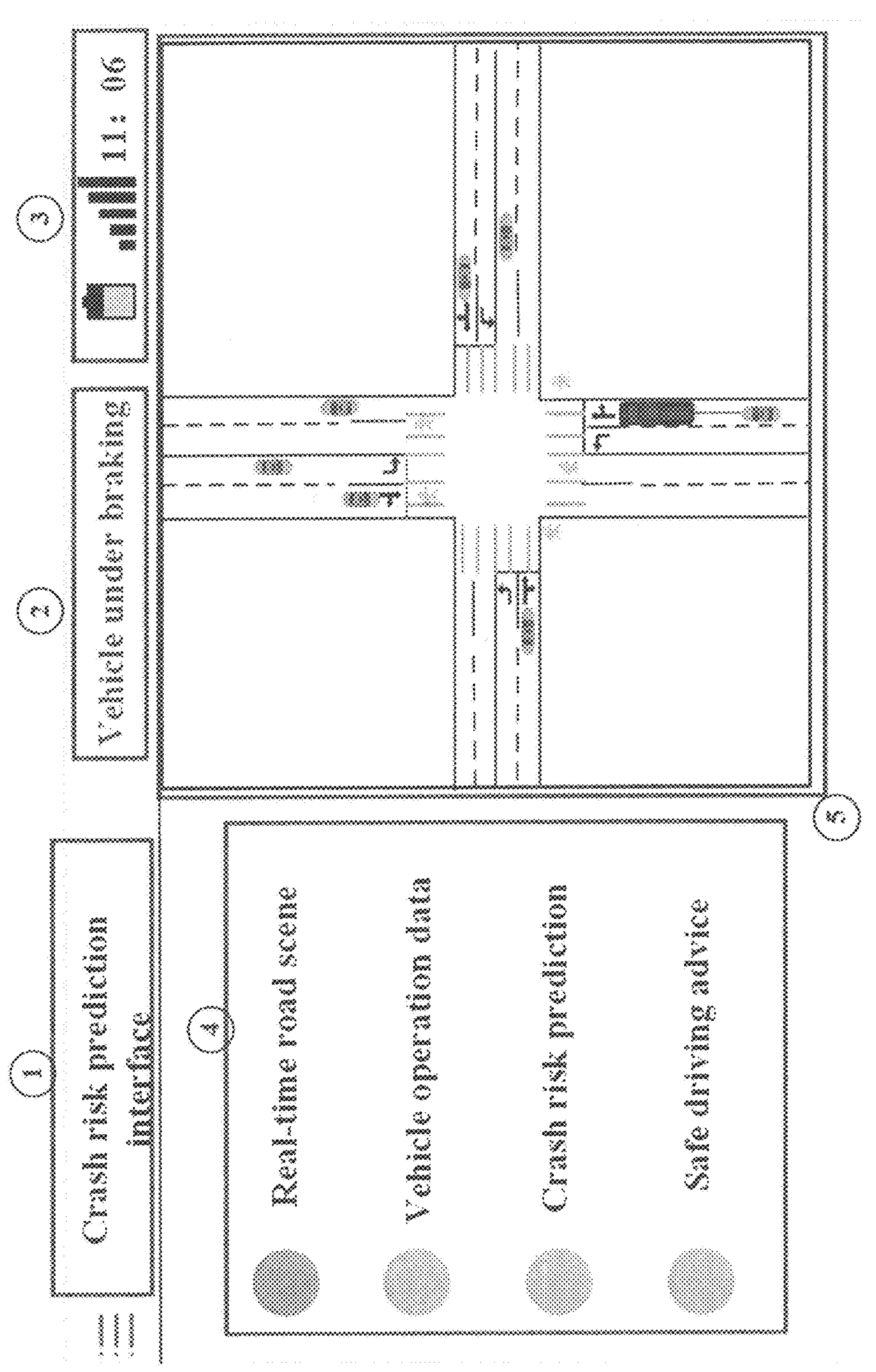
FIG. 7 is a display diagram of the collision risk prediction result of the emergency rescue autonomous driving vehicle.
Figure 7:
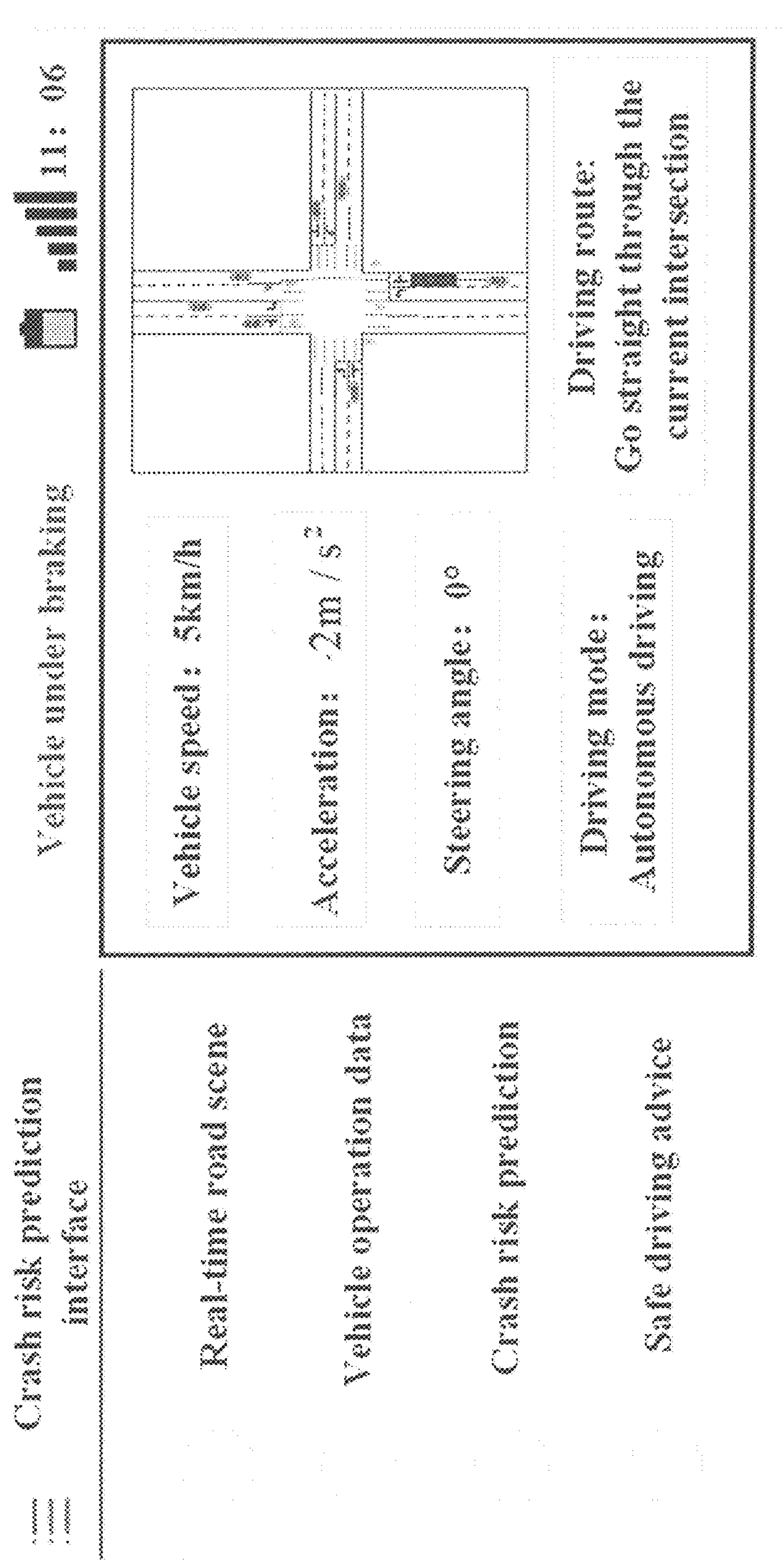
Figure 7:
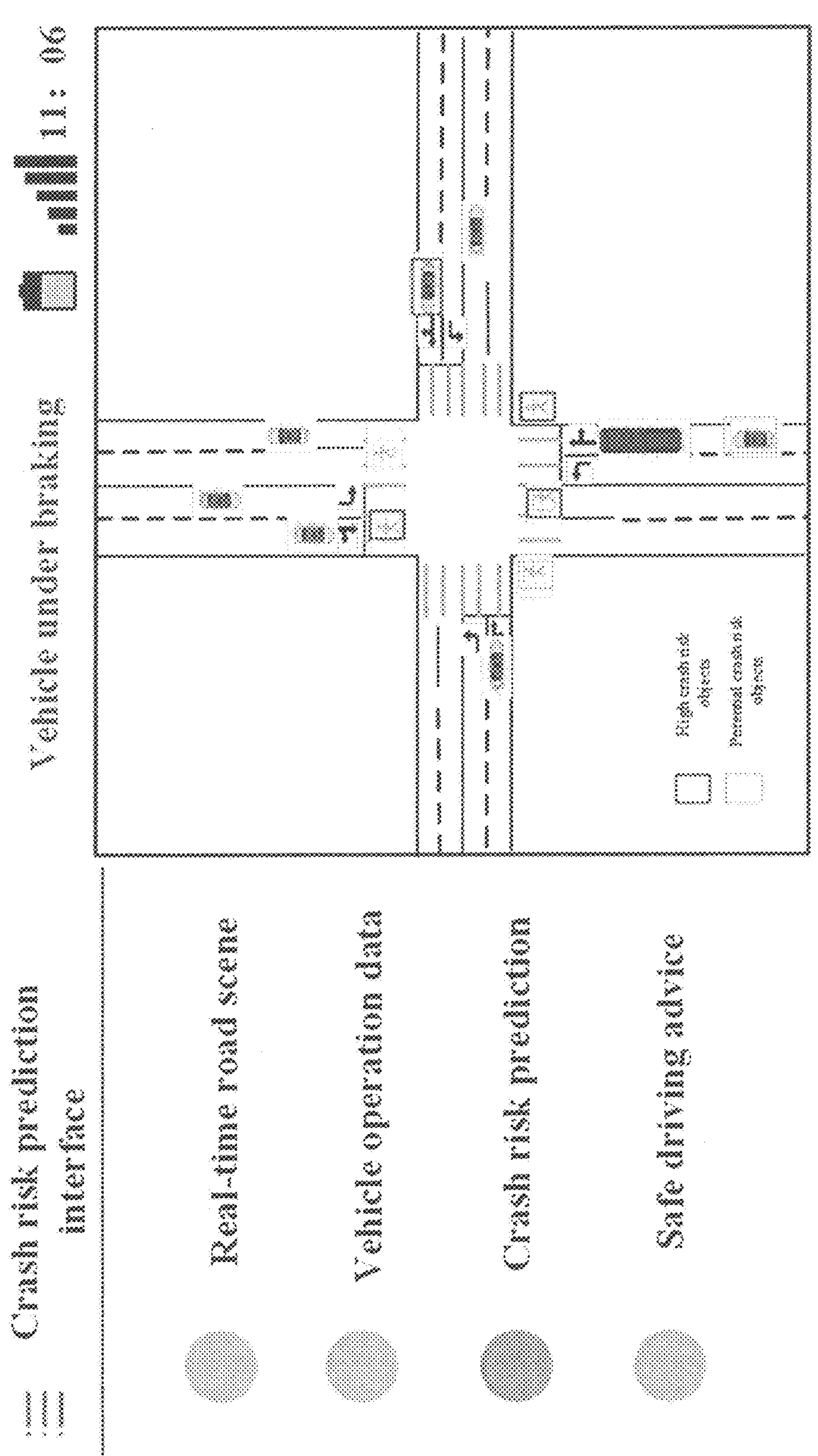
Figure 7:
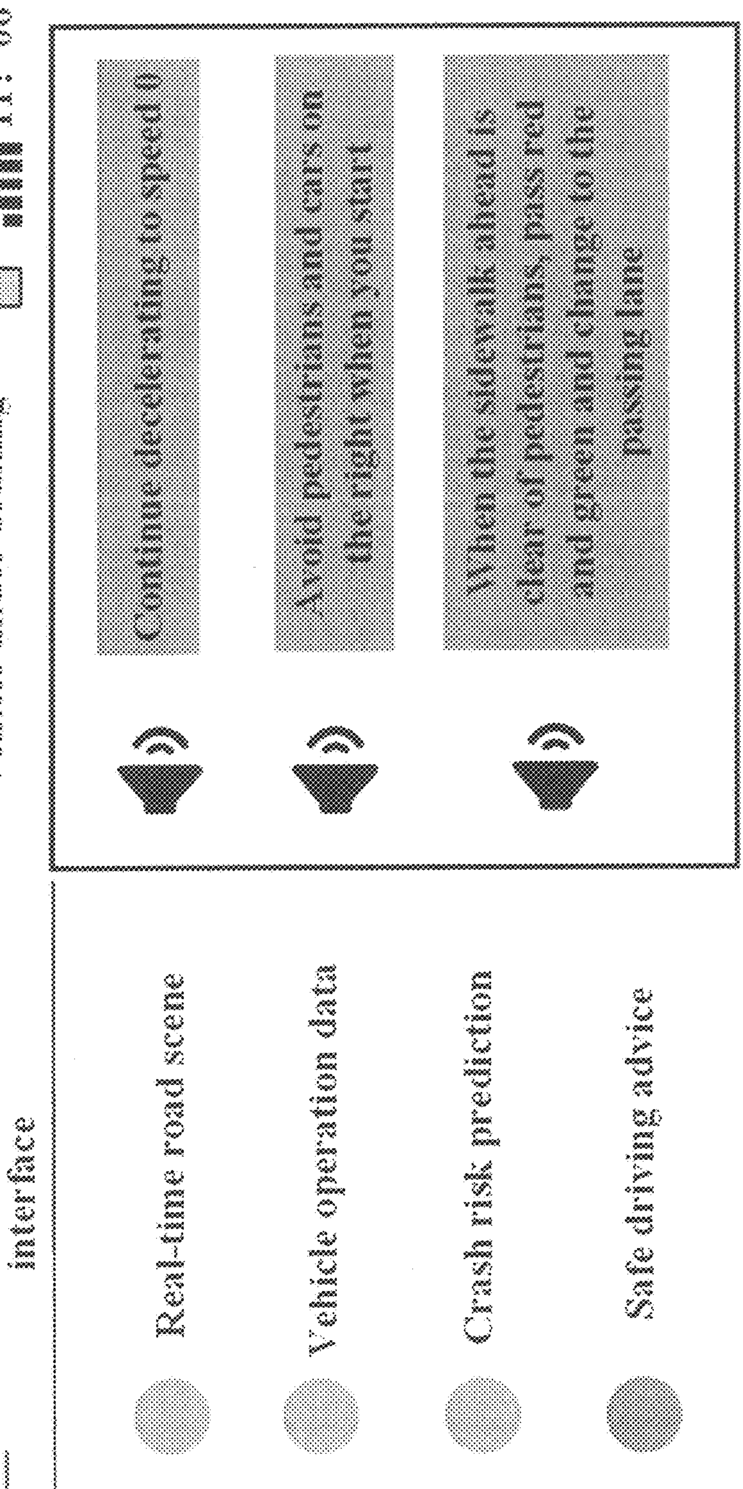

FIGS. 7 (*a*), (*b*), (*c*) and (*d*) are diagrams showing the collision risk prediction results of the emergency rescue autonomous driving vehicle mentioned in this application. It should be noted that the diagram only serves as an example of the interface for collision risk prediction of emergency rescue autonomous driving vehicles, contains only the necessary functions, and can be improved in the future according to specific needs, and is not a constraint of this application.

Referring to FIG. 7 (*a*), the interface consists of five parts. Box 1 shows that the functional interface is the collision risk prediction interface, and its other functional interface, such as driving model switching and emergency rescue information, is not explained here and can be further improved in the future. Box 2 shows the current running state of the vehicle, including starting, driving, braking, stopping, etc.; Box 3 shows the current remaining power, signal strength and time. Box 4 shows the four display interface keys of the collision risk prediction system: "Real-time road scene", "vehicle operation data", "collision risk prediction", and "safe driving advice". The specific display information can be viewed by selecting different function buttons. Box 5 corresponds to showing the specific information of the function keys selected by Box 4.

In detail, the "real-time road scene" interface (see FIG. 7 (*a*)) can fully display the road environment and the specific location of the surrounding moving objects of the emergency rescue vehicle at the current moment, so that the driver can perceive and understand the surrounding environment information concretely and comprehensively. The "vehicle running data" interface (see FIG. 7 (*b*)) shows the current vehicle movement status and route, which can guide the driver's behavior and is very important for collision risk prediction; the "collision risk prediction" interface (see FIG. 7 (*c*)) shows the surrounding high and potential collision risk objects. The "safe driving advice" interface (see FIG. 7 (*d*)) provides the driver with a safe driving plan and alerts the driver in the form of voice broadcast by analyzing the predicted collision risk.

An autonomous driving vehicle collision risk prediction system for emergency rescue based on HM-TRW and HAGENN structure search, the graph embedding algorithm is used to learn the complex relationship between nodes, which encodes all nodes in the graph and maps them into equal-dimensional vectors that can be directly used by machine learning algorithms, so as to achieve efficient and accurate pre-prediction. In order to retain more effective information between nodes, this application further extends the graph embedding algorithm to a hierarchical attention graph embedding neural network algorithm, which improves the ability to capture structural heterogeneity and dynamics. In the collision risk prediction of emergency rescue vehicles, hierarchical attention graph embedding neural network can predict the potential conflict relationship between emergency rescue vehicles and surrounding moving objects by learning the complex relationship between emergency rescue vehicles and surrounding moving objects, and then predict the collision risk. Therefore, this application is expected to provide accurate and efficient collision risk prediction service for emergency rescue vehicles, and on this basis, it can further guide drivers' decision-making and help autonomous driving vehicles plan more safe and efficient driving paths. so as to better serve the cause of emergency rescue.

The emergency rescue autonomous driving vehicle collision risk prediction method based on HM-TRW and HAGENN structure search in this application abstracts the complex interaction between the emergency rescue vehicle and the surrounding moving objects into a dynamic heterogeneous graph on the basis of perceiving the surrounding environment of the autonomous driving vehicle and combining with the self-vehicle operation data. Then, the random walk algorithm and hierarchical attention graph embedding algorithm are used to model the complex interaction between them to learn the importance of the surrounding moving objects and their interactions with emergency rescue vehicles. Then, the test set self-vehicle data and surrounding moving object data are input into the trained model to calculate the collision risk under the future timestamp. Finally, according to the actual needs, the predicted collision risk is visualized to assist drivers to take risk aversion operation safely and efficiently. This application can provide more efficient and accurate collision risk prediction for emergency rescue autonomous driving vehicles, ensure the efficiency and safety of emergency rescue, and help to build a safe traffic environment.

The invention claimed is:

1. A collision risk prediction method of emergency rescue autonomous driving vehicle based on HM-TRW and HAGENN structure search, comprising:

collecting, in a real vehicle experiment, self-vehicle data and surrounding moving object data by data acquisition equipment, and preprocessing and storing the self-vehicle data and the surrounding moving object data in a database;

constructing a dynamic heterogeneous graph by using the self-vehicle data and the surrounding moving object data, and learning heterogeneous characteristics and dynamic changing rules of the dynamic heterogeneous graph by a high-order memory guided time random walk algorithm, wherein a node representation of surrounding moving objects is then fed to a hierarchical attention graph embedding neural network to predict a collision risk;

inputting a training set and verification set in the database into a collision risk prediction model to optimize a model parameters;

using a test set in the database to test the collision risk prediction model to obtain test results, and evaluating and analyzing performance of the collision risk prediction model according to the test results; and performing real-time collection of emergency rescue autonomous driving vehicle data and the surrounding moving object data, inputting the real-time collection of emergency rescue autonomous driving vehicle data and the surrounding moving object data into the collision risk prediction model after the test to realize collision risk prediction;

wherein construction of the dynamic heterogeneous graph comprises representing an emergency rescue vehicle and surrounding moving objects of the emergency rescue vehicle as nodes, and expressing various interactive relations between the emergency rescue vehicle and the surrounding moving objects of the emergency rescue vehicle as edges, wherein the nodes and the edges change dynamically over time to form the dynamic heterogeneous graph, and the expression of the various interactive relations is as follows:

$$G^t = (v^t, e^t, u^t)$$

where $v^t$ is a node set with node type $h \in H$, $e^t$ is an edge set with edge type $r \in R$, $u^t \in \mathbb{R}$ represents a feature set of all moving objects, H and R are node type set and edge type set, respectively, $\mathbb{R}$ represents real number set, N is a number of the nodes, and D is a characteristic dimension;

wherein the heterogeneous characteristics of the dynamic heterogeneous graph include:

(1) transfer vectors, wherein an initial high-order memory queue is set to be empty, and type transfer vector visits each type of surrounding moving object with equal probability, when the surrounding motion object $v_j$ is visited, a type transfer vector $p_{v_j}$ of the surrounding motion object $v_j$ is updated as follows:

$$p_{v_j} \leftarrow Norm\left(p_{v_j} + Q_{\phi(v_j)}\right)$$

where $\phi(v_j)$ denotes the type of the surrounding moving object $v_j$, Q represents a first-in, first-out (FIFO) queue, and Norm $(\cdot)$ represents a two-norm of the return vector;

(2) type conversion, wherein a type of a next surrounding moving object to be visited is determined according to a probability distribution of $p_{v_j}$, and a type trap problem is solved by using a search mechanism with search factor $= \in [0, 1]$, as follows:

$$Pr(h_{n+1}) = \alpha p_{v_j} + (1-\alpha) p^0_{v_j}$$

where, $$p^0_{v_j}$$

represents the surrounding moving object originally visited by the type transfer vector, and $Pr(h_{n+1})$ represents a probability that a type of the next surrounding moving object to be visited is $h_{n+1}$;

(3) high-order memory recording, wherein after visiting the surrounding moving object $v_j$, the type transfer vector $p_{v_j}$ is stored in a next FIFO queue as follows:

$$Q'_{\phi(v_j)} \leftarrow Put\left(p_{v_j}, Q_{\phi(v_j)}\right)$$

where, Put is a queue operator, which means that when the FIFO queue is full, a first transfer vector is popped up and placed at an end of the FIFO queue;

wherein learning the dynamic changing rules of the dynamic heterogeneous graph comprises:

using, for emergency rescue vehicle $v_i$, $h_{n+1}$ to indicate the type of moving object around the emergency rescue vehicle $v_i$, wherein:

$$N^t_{n+1}(v_i) = \{v_j | (v_i, v_j) \in e^t, \phi(v_j) = h_{n+1}, t \geqq t'\}$$

where $$N^t_{n+1}(v_i)$$

represents a collection of surrounding moving objects under a future timestamp of the emergency rescue vehicle $v_i$, t' represents a time stamp of a previous random walk, and $e^t$ is an edge set of edge types;

taking an exponential falloff distribution to select a next moving object to visit from a collection $$N_{n+1}^{t}(v_i),$$

wherein:

$$Pr(v_{n+1}) = \frac{\exp(-\delta\cdot(t-t'))}{\sum_{v_k\in N_{n+1}^{t}}\exp(-\delta\cdot(t_k-t'))}$$

where $t_k \in t$, t represents the time stamp, $t_k$ represents a time stamp of a $k^{th}$ step random walk in the future, $Pr(v_{n+1})$ represents a probability that the next moving object to be visited is $v_{n+1}$, and $v_k$ represents the surrounding moving object visited by the $k^{th}$ step random walk; a discount rate $\delta \in [0,1]$;

wherein the node representation of each of the surrounding moving objects combines an output of the high-order memory guided time random walk algorithm with original features of each of the surrounding moving object, wherein:

$$x_{v_j}^{f} = [p_{v_j}][u_{v_j}]W_f$$

$$x_{v_j}^{id} = o_{v_j}^{T}\cdot E$$

$$x_{v_j} = \left[x_{v_j}^{f}\right]\left[x_{v_j}^{id}\right]\cdot W$$

where, $p_{v_j}u_{v_j}$ and $$o_{v_j}^{T}$$

are the transfer vector, the original feature and a unique thermal vector of the surrounding moving object $v_j$, respectively, $E \in \mathbb{R}$ is a potential embedding of all of the moving objects, $\mathbb{R}$ represents real number set, N is the number of the nodes, D is the characteristic dimension, $W_f$ and W represent learnable parameters that are not shared between the surrounding moving object $v_j$ and other moving objects, $$x_{v_j}^{f},\ x_{v_j}^{id}$$

and $x_{v_j}$ represent the original feature, a recognition embedded feature and a final node representation of the surrounding moving object, respectively;

wherein the hierarchical attention graph embedding neural network is used to predict a collision risk by aggregating different information through node-level attention, edge-level attention and time-level attention;

for node-level attention, when the timestamp is t, for an interaction type r, an importance $$\alpha_{ij}^{rt}$$

between the emergency rescue vehicle $v_i$ and the surrounding moving object $v_j$ is calculated by the following formula:

$$\alpha_{ij}^{rt} = \frac{\exp\left(\sigma\left(a_r^{T}[U_{nl}^{r}x_j \| U_{nl}^{r}x_j]\right)\right)}{\sum_{k\in N_i^{rt}}\exp\left(\sigma\left(a_r^{T}[U_{nl}^{r}x_i \| U_{nl}^{r}x_k]\right)\right)}$$

where $\sigma$ is an activation function, $x_i$ and $x_j$ are input representations of the emergency rescue vehicle $v_i$ and the surrounding moving object $v_j$, respectively, $$U_{nl}^{r}$$

is a linear transformation matrix, $\|$ indicates a connection, $$N_i^{rt}$$

represents all the surrounding moving objects of the emergency rescue vehicle $v_i$ of the interaction type r under the timestamp t, $a_r$ is a weight vector, $$a_r^{T}$$

is a transpose of $a_r$, $x_k$ represents a $k^{th}$ moving object around a self-vehicle;

a node embedding of the emergency rescue vehicle $v_i$ with the interaction type r under the timestamp t is represented as:

$$g_i^{rt} = \sigma\left(\sum_{v_j\in N_i^{rt}}\alpha_{ij}^{rt}U_{nl}^{r}v_j\right)$$

wherein for marginal attention, an attention mechanism is used to learn an importance $$\beta_i^{rt}$$

of different types of interactions and calculated by multi-layer perceptrons, wherein:

$$\beta_i^{rt} = \frac{\exp\left(w^{T}\cdot\sigma(U_{el}g_i^{rt}+b_{el})\right)}{\sum_{l=1}^{R}\exp\left(w^{T}\cdot\sigma\left(U_{el}g_i^{lt}+b_{el}\right)\right)}$$

where $w^T$ is an edge-level attention vector, $U_{el}$ and $b_{el}$ are single-layer parameters of the multi-layer perceptrons, and R is a set of edge types;

wherein fusion embedding of the emergency rescue vehicle $v_i$ considering the importance of different types of interaction is expressed as:

$$g_i^{t} = \sum_{r=1}^{R}\beta_i^{rt}\cdot g_i^{rt}$$

for time-level attention, the fusion embedding of the emergency rescue vehicle under all timestamps is aggregated and packaged to $G_i \in \mathbb{R}$, T represents a number of historical timestamps used to predict collision risk, and a fused embedded query-key-value vector is calculated as follows:

$$P = G_i \cdot U_P$$

$$K = G_i \cdot U_K$$

$$V = G_i \cdot U_V$$

where P, K and V represent query, key and value vector, respectively, and $U_P$, $U_K$ and $U_V$ represent corresponding matrixes that convert $G_i$ into the query, key and value vector;

wherein a softmax function is used to calculate the time-level attention:

$$Z_i = \text{softmax}\left(\frac{PK^T}{\sqrt{D'}} + M\right) \cdot V$$

where $Z_i$ represents the time-level attention, $M \in \mathbb{R}$ is a mask matrix, and D' is a dimension of the query-key-value vector;

wherein by using $$Z_i^T$$

as a final embedding fusion, the collision risk is calculated as:

$$Y = \text{softmax}\left(W_2 \cdot ReLU\left(W_1 \cdot Z_i^T + b_1\right) + b_2\right)$$

where, softmax (·) is an output activation function, $W_1$ and $W_2$ are weight matrixes of the hierarchical attention graph embedding neural network, ReLU (·) is the activation function, and $b_1$ and $b_2$ represent an offset term.

2. The emergency rescue autonomous driving vehicle collision risk prediction method according to claim 1, wherein an attention positioning space is used to determine an application position of attention in the hierarchical attention graph embedding neural network;

the type of surrounding moving object, a type of interaction and a number of timestamps are selected through a matrix $A^{L_O}$, as follows:

$$A^{L_O} = \{0, 1\}^{T \times T \times |R|}$$

when the timestamp is t, the matrix $$A_{t,t',r}^{L_O}$$

determines whether it is necessary to pay attention to surrounding moving objects $$N_i^{rt'}$$

with interaction type r, $$N_i^{rt'}$$

represents all the surrounding moving objects of the emergency rescue vehicle $v_i$ of the interaction type r under the timestamp t';

wherein by using the attention positioning space, time complexity is computed as follows:

$$O\left(\sum_{t=1}^{T}\sum_{t'=1}^{T}\sum_{r\in R} A_{t,t',r}^{L_O}\left|e_r^{t'}\right|\right) = O\left(\left|A^{L_O}\right| \max_{1\le t\le T, r\in R}\left|e_r^{t}\right|\right)$$

where, $|A^{L_O}|$ represents a number of non-zero values in $A^{L_O}$, T represents the number of historical timestamps used to predict the collision risk, $$\left|e_r^{t'}\right| \text{ and } \left|e_r^{t}\right|$$

represent a number of interactions of type r under timestamps t' and t, respectively, O (·) represents the time complexity, and |R | indicates the number of edge types.

3. The emergency rescue autonomous driving vehicle collision risk prediction method according to claim 2, wherein an attention parameterization space is used to determine a calculation mode of attention function in the hierarchical attention graph embedding neural network;

wherein the attention parameterization space $A^{P\alpha}$ is used to search for the attention function, as follows:

$$A^{Pa} = A^N \times A^R$$

where $A^N=\{1, \ldots, K_N\}^{T\times|H|}$ is a parameterized matrix of a node mapping function $F^N(\cdot)$, $A^R=\{1, \ldots, K_R\}^{2T\times|H|}$ is a parameterized matrix of an edge mapping matrix $F^R(\cdot)$, $K_N$ and $K_R$ are two superparameters, and |H| indicates a number of node types.

4. The emergency rescue autonomous driving vehicle collision risk prediction method according to claim 3, wherein a parameter search complexity of the attention positioning space and the parameterization space is reduced by using multi-stage differential search, wherein the emergency rescue vehicle only accepts information from the surrounding moving objects from historical time, and $$\left|A_t^{L_O}\right| \leqq K_{L_O}$$

is used to constrain a number of surrounding moving objects and interactive relationships for the collision risk prediction under each of the timestamp, where $K_{L_O}$ is a super parameter, 1≤t≤T;

wherein supernet is used to transform parameter search in location space and parameterized space into a neural structure search problem, wherein a selection of the operation is expressed as a probability distribution:

$$\bar{F}(x) = \sum_{i=1}^{|A|} \frac{\exp(\beta_i)}{\sum_{j=1}^{|A|} \exp(\beta_j)} F_i(x)$$

where x is input, $\bar{F}(x)$ is output, $|A|$ indicates a number of operations, and $\beta_i$ represents a mixed weight of a mapping function $F_i(\cdot)$ corresponding to an $i^{th}$ operation;

wherein by using supernet, all parameters in the mixed weight $\beta$ and the mapping function are optimized in a differentiable way as follows:

$$w \leftarrow w - \eta_w \frac{\partial \mathcal{L}_{train}}{\partial w}, \quad \beta \leftarrow \beta - \eta_\beta \frac{\partial \mathcal{L}_{val}}{\partial \beta}$$

where $\eta_w$ and $\eta_\beta$ represent a learning rate of structural weight and model weight respectively, $\mathcal{L}_{train}$ and $\mathcal{L}_{val}$ represent a loss function of the training set and the verification set respectively, and w represents the structural weight and $\beta$ represents model weight, wherein, in order to stabilize supernet training, a training process is divided into three stages: moving object parameterization, interaction parameterization and attention location space search, wherein each of the three stages focuses on different parameterized space.

5. A system for implementing an emergency rescue autonomous driving vehicle collision risk prediction method described in claim 1, wherein the system includes:

data acquisition equipment, including vehicle sensors, roadside equipment and communication technology, for collecting the self-vehicle data and the surrounding moving object data;

a data preprocessing module, used for cleaning, normalization, feature extraction, data reduction and data set division of the self-vehicle data and the surrounding moving object data;

the prediction model, including the high-order memory guided time random walk algorithm, the hierarchical attention graph embedding neural network and an optimal parameter search module, wherein the optimal parameter search module includes attention positioning space, attention parameterization space and a multi-stage differential search module; and a visualization module, used to display the predicted collision risk.

6. A system for implementing an emergency rescue autonomous driving vehicle collision risk prediction method described in claim 3, wherein the system includes:

data acquisition equipment, including vehicle sensors, roadside equipment and communication technology, for collecting the self-vehicle data and the surrounding moving object data;

a data preprocessing module, used for cleaning, normalization, feature extraction, data reduction and data set division of the self-vehicle data and the surrounding moving object data;

the prediction model, including the high-order memory guided time random walk algorithm, the hierarchical attention graph embedding neural network and an optimal parameter search module, wherein the optimal parameter search module includes the attention positioning space, attention parameterization space and a multi-stage differential search module; and a visualization module, used to display the predicted collision risk.

7. A system for implementing an emergency rescue autonomous driving vehicle collision risk prediction method described in claim 3, wherein the system includes:

data acquisition equipment, including vehicle sensors, roadside equipment and communication technology, for collecting the self-vehicle data and the surrounding moving object data;

a data preprocessing module, used for cleaning, normalization, feature extraction, data reduction and data set division of the self-vehicle data and the surrounding moving object data;

the prediction model, including the high-order memory guided time random walk algorithm, the hierarchical attention graph embedding neural network and an optimal parameter search module, wherein the optimal parameter search module includes the attention positioning space, the attention parameterization space and a multi-stage differential search module; and a visualization module, used to display the predicted collision risk.

8. A system for implementing an emergency rescue autonomous driving vehicle collision risk prediction method described in claim 4, wherein the system includes:

data acquisition equipment, including vehicle sensors, roadside equipment and communication technology, for collecting the self-vehicle data and the surrounding moving object data;

a data preprocessing module, used for cleaning, normalization, feature extraction, data reduction and data set division of the self-vehicle data and the surrounding moving object data;

the prediction model, including the high-order memory guided time random walk algorithm, the hierarchical attention graph embedding neural network and an optimal parameter search module, wherein the optimal parameter search module includes the attention Page 12 positioning space, the attention parameterization space and a multi-stage differential search module; and a visualization module, used to display the predicted collision risk.

* * * * *